(12) United States Patent
Hu et al.

(10) Patent No.: US 9,455,650 B2
(45) Date of Patent: Sep. 27, 2016

(54) TWO-DIMENSIONAL LOCATING METHOD OF MOTION PLATFORM BASED ON MAGNETIC STEEL ARRAY

(75) Inventors: Jinchun Hu, Beijing (CN); Yu Zhu, Beijing (CN); Jinsong Wang, Beijing (CN); Ming Zhang, Beijing (CN); Kai Liao, Beijing (CN); Kaiming Yang, Beijing (CN); Dengfeng Xu, Beijing (CN); Wensheng Yin, Beijing (CN); Guanghong Duan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 1059 days.

(21) Appl. No.: 13/522,788

(22) PCT Filed: Jan. 18, 2011

(86) PCT No.: PCT/CN2011/070348
§ 371 (c)(1),
(2), (4) Date: Oct. 5, 2012

(87) PCT Pub. No.: WO2011/088776
PCT Pub. Date: Jul. 28, 2011

(65) Prior Publication Data
US 2013/0024157 A1 Jan. 24, 2013

(30) Foreign Application Priority Data
Jan. 19, 2010 (CN) .......................... 2010 1 0034190

(51) Int. Cl.
G06F 17/11 (2006.01)
H02N 15/00 (2006.01)
G01D 5/14 (2006.01)

(52) U.S. Cl.
CPC ............. *H02N 15/00* (2013.01); *G01D 5/145* (2013.01)

(58) Field of Classification Search
USPC ................................ 702/150, 151, 152, 153
See application file for complete search history.

(56) References Cited

U.S. PATENT DOCUMENTS

| 6,167,991 B1 | 1/2001 | Full et al. |
| 6,194,705 B1 | 2/2001 | Nakada et al. |
| 2010/0321008 A1* | 12/2010 | Mita et al. ............... 324/207.25 |

FOREIGN PATENT DOCUMENTS

| CN | 101087114 A | 12/2007 |
| CN | 101610054 A | 12/2009 |

(Continued)

OTHER PUBLICATIONS

Notice of Reasons for Rejection for Chinese Patent Application 2010-10034190.0, Oct. 13, 2010, Chinese Patent Office.

(Continued)

*Primary Examiner* — Mohamed Charioui
(74) *Attorney, Agent, or Firm* — Kubotera & Associates, LLC

(57) ABSTRACT

A two-dimensional locating method of a motion platform based on a magnetic steel array involves the following steps: placing more than four linear Hall sensors at any different positions within one or more polar distances of the magnetic steel array on the surface of the motion platform in a motion system; determining a magnetic flux density distribution model according to the magnetic steel array; determining the mounting positions of the above-mentioned linear Hall sensors, which are converted into phases with respect to the mass center of the motion platform; recording the magnetic flux density measured values of the linear Hall sensors as the motion proceeds; solving the phases of the mass center of the motion platform in a plane, with the measured values being served as observed quantities and the magnetic flux density distribution model being served as a computation model; and determining the position of the mass center of the motion platform with respect to an initial phase according to the phase, so as to realize the planar location of the motion platform. The present invention provides a simple, fast and robust method for computing mass center positions for a motion system containing a magnetic steel array.

5 Claims, 4 Drawing Sheets

(56) References Cited

FOREIGN PATENT DOCUMENTS

| CN | 101750187 A | 6/2010 |
|---|---|---|
| CN | 101769764 A | 7/2010 |

OTHER PUBLICATIONS

Notice of Reasons for Allowance for Chinese Patent Application 2010-1034190.0, Jan. 7, 2011. Chinese Patent Office.

* cited by examiner

TWO-DIMENSIONAL LOCATING METHOD OF MOTION PLATFORM BASED ON MAGNETIC STEEL ARRAY

FIELD OF THE INVENTION

The present invention relates to a measuring method for a moving component based on a magnetic steel array, particularly to a measuring method utilizing linear Hall sensors, which belongs to the field of measuring and data processing technology.

BACKGROUND

At present, many modern scientific instruments need accurate magnetic field circumstance for operation; in fields such as navigation, communication, magnetic levitation trains and medical applications, many equipments also function based on measurements of magnetic fields. In particular, magnetic field finds more applications in fields of electrical motors such as multi-degree-of-freedom motors and servomotors.

A moving coil type magnetic levitation planar motor is a motor that functions based on a magnetic field circumstance generated by a magnetic steel array, and can realize long range motion by enlarging the area of the magnetic steel array. It has a large and particularly arranged magnetic steel array positioned on a stationary platform and has several sets of moving coils positioned on a moving platform and connected with a workbench. During the motion of the workbench, it is possible to determine the position of the workbench only by determining the positions of the moving coils.

In many motion systems including planar motors, high precision grating rulers are used as position detecting elements, which have high measurement accuracy but require complex circuits and optics, thus resulting in high cost. At the same time, there are also systems that directly utilize Hall sensors to measure positions. The patent PCT/IB01/02509 describes a system including magnetic steel arrays and moving coils, and relates to a direct use of Hall sensors for position measurements. However, noise exists in both the measured signals per se and the sampling process, which leads to a loss of measurement accuracy.

SUMMARY

The object of the present invention is to provide a two-dimensional locating method of a motion platform based on a magnetic steel array, and realize a method for solving the phase of the motion platform. The present invention is not limited to planar motors, and can be referenced or applied to any motion systems containing a magnetic steel array and relating to a location issue under a magnetic field circumstance. This invention provides a motion system containing a magnetic steel array with a simple, convenient and robust platform locating method by combining the data of multiple sensors so as to reduce costs and noise influence on measurement accuracy.

To achieve the above-mentioned object, the present invention adopts a technical solution as follows:

A two-dimensional locating method of a motion platform based on a magnetic steel array, characterized in that said method comprises:

1) selecting any n different positions within one or more polar distances of the magnetic steel array on the surface of the motion platform in the motion system and placing 1 linear Hall sensor at each position, wherein positions with a same phase within different polar distances are considered to be the same position and n equals to at least 4;

2) determining a formula for the magnetic flux density distribution model according to the magnetic steel array in the motion system:

$$B_z = A \times \sin(X + \alpha + \alpha_0) + B \times \sin(Y + \beta + \beta_0);$$

in which $B_z$ represents the magnetic flux density of the magnetic steel array, A and B represent the magnitude components of the magnetic flux density distribution model, X and Y represent the phases to be solved of the mass center of the motion platform on X axis and Y axis, respectively, $\alpha$ and $\beta$ represent the phases on X and Y axis of the mounting position of the linear Hall sensor with respect to the mass center of the motion platform, respectively, $\alpha_0$ and $\beta_0$ represent the initial phases on X and Y axis, respectively;

3) prior to the movement of the motion platform, measuring the mounting positions $(S_{\alpha i}, S_{\beta i})$ of the linear Hall sensors mentioned in step 1), in which i=1, 2Λ, n, and converting them into the phases $(\alpha_i, \beta_i)$ with respect to the mass center of the motion platform, in which i=1, 2Λ, n;

4) during the operation of the motion platform, recording the measured values of the magnetic flux density $B_{zi}$ of all linear Hall sensors mentioned in step 3), in which i=1, 2Λ, n;

5) solving the phase (X,Y) of the mass center of the motion platform, which is a relative phase, through a mathematical algorithm with the measured values in step 4) being served as observed quantities and the magnetic flux density distribution model of the magnetic steel array in step 2) being served as a computation model;

6) according to the phase (X,Y) of the mass center of the motion platform solved in step 5), further determining the position $(S_x, S_y)$ of the mass center of the motion platform with respect to the initial phase, in which the initial phase is given by a mechanical zero mounted on the motion platform.

The above-mentioned technical solution is characterized in that the relationships between the phases $(\alpha_i, \beta_i)$ of said linear Hall sensors with respect to the mass center of the motion platform and the mounting positions $(S_{\alpha i}, S_{\beta i})$ thereof are as follows:

$$\alpha_i = \frac{S_{\alpha i}}{\tau} \times 2\pi, \beta_i = \frac{S_{\beta i}}{\tau} \times 2\pi,$$

in which $\tau$ is the polar distance of the magnetic steel array of the stationary platform.

In the present invention, the phase (X,Y) of the mass center of the motion platform solved in step 5) may be subjected to the following processing:

assuming $(X_r, Y_r)$ is the phase of the mass center of the motion platform with respect to the initial phase, $N_x$ is the number of the skipped periods with respect to the initial phase in X direction, $N_y$ is the number of the skipped periods with respect to the initial phase in Y direction, then $X_r = N_x \times 2\pi + X$, $Y_r = N_y \times 2\pi + Y$, that is, getting the phase of the mass center of the motion platform with respect to the initial phase, and then getting the position of the mass center of the motion platform with respect to the initial phase by $$S_x = \frac{X_r}{2\pi} \times \tau, S_y = \frac{Y_r}{2\pi} \times \tau.$$

said mathematical algorithm in the step 5) of the present invention may be implemented with a unscented Kalman filtering algorithm, and/or a nonlinear least square algorithm, and/or an extended Kalman filtering algorithm.

The present invention is also characterized in that a method for determining the number of the skipped periods with respect to the initial phase may be as follows:

a. assuming that $(X_n,Y_n)$ is the solved phase of the mass center of the motion platform at the present moment of time, $(X_{n-1},Y_{n-1})$ is the solved phase of the mass center of motion platform at the previous moment of time, $N_{xn}$ and $N_{yn}$ are the number of the skipped periods with respect to the initial phase at the present moment of time, $N_{x(n-1)}$ and $N_{y(n-1)}$ are the number of the skipped periods with respect to the initial phase at the previous moment of time;

b. when $(X_n-X_{n-1})>\pi$ and it is determined that the movement velocity in X direction of the motion platform is positive, $N_{xn}=N_{x(n-1)}+1$, when $(X_n-X_{n-1})>\pi$ and it is determined that the movement velocity in X direction of the motion platform is negative, $N_{yn}=N_{y(n-1)}-1$; when $(Y_n-Y_{n-1})>\pi$ and it is determined that the movement velocity in Y direction of the motion platform is positive, $N_{yn}=N_{y(n-1)}+1$, when $(Y_n-Y_{n-1})>\pi$ and it is determined that the movement velocity in Y direction of the motion platform is negative, $N_{yn}=N_{y(n-1)}-1$; when $(X_n-X_{n-1})\leq\pi$, $N_{xn}=N_{x(n-1)}$, and when $(Y_n-Y_{n-1})\leq\pi$, $N_{yn}=N_{y(n-1)}$.

The present invention has the following advantages and prominent effects by using the above technical solution: Realizing the two-dimensional planar location of a motion platform and providing a simple, fast and robust method of computing positions for a motion system containing a magnetic steel array. The idea and effects of the present invention have practical significance for the research and development in the location of a motion system containing a magnetic steel array, such as a magnetic levitation, or an air levitation planar motor.

DETAILED DESCRIPTION

Implementations of the present invention will be further described in detail below with reference to the drawings.

Figure 1:
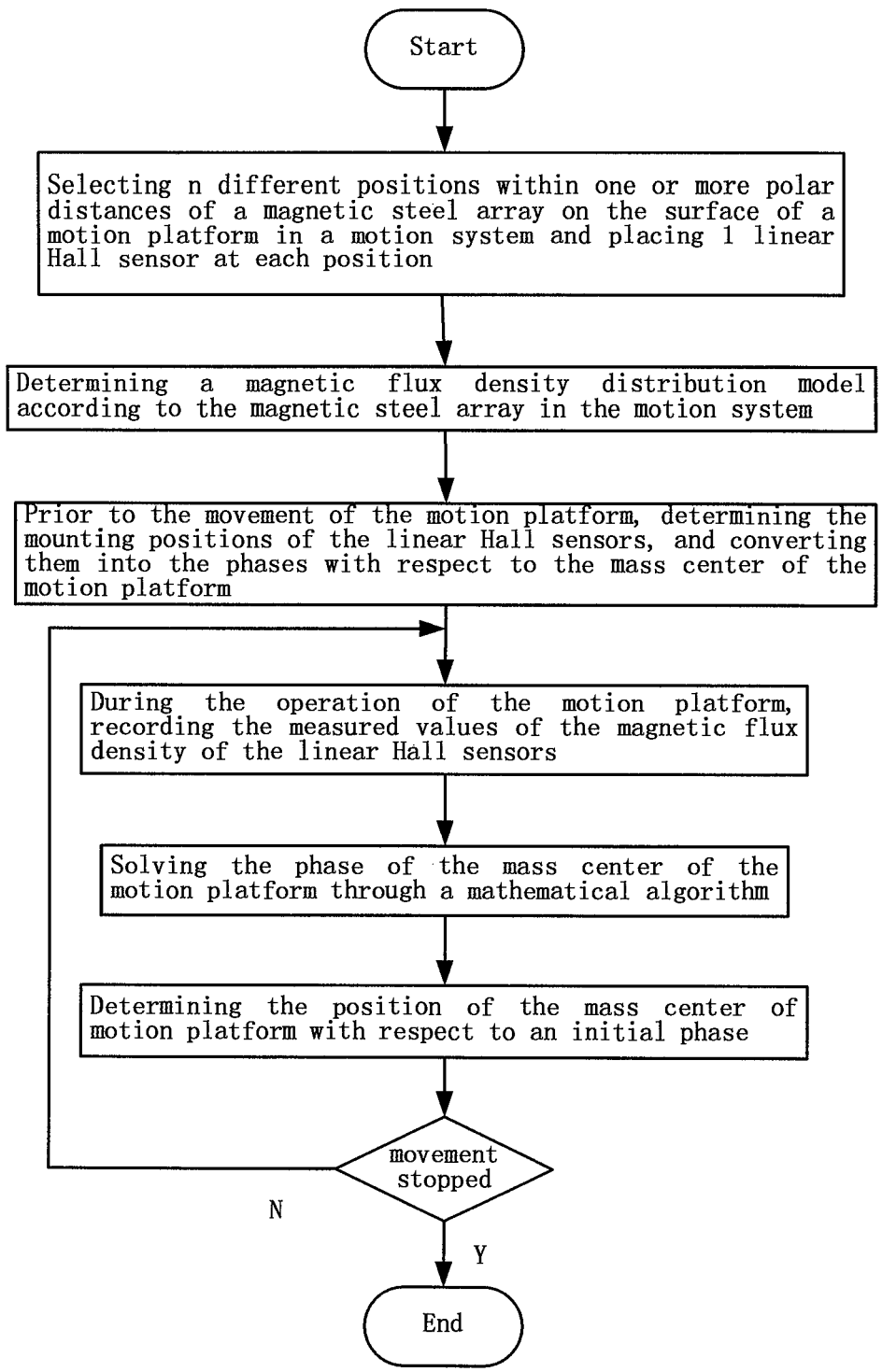
FIG. 1 is an algorithm flowchart of the present invention.
Figure 2:
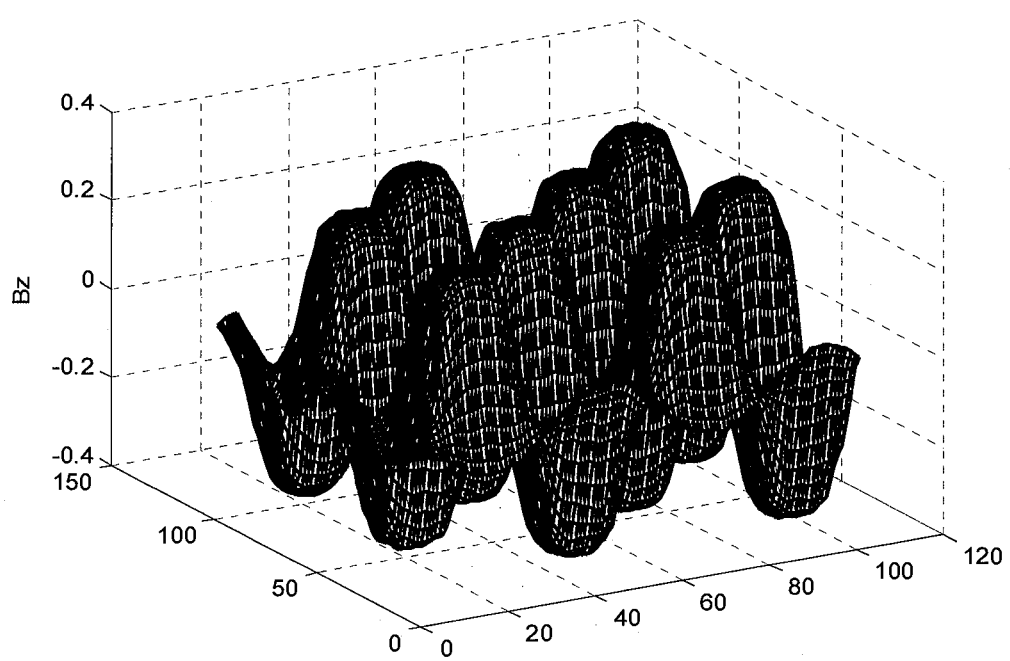
FIG. 2 is a magnetic flux density distribution map of the magnetic steel array according to the present invention.
Figure 3:
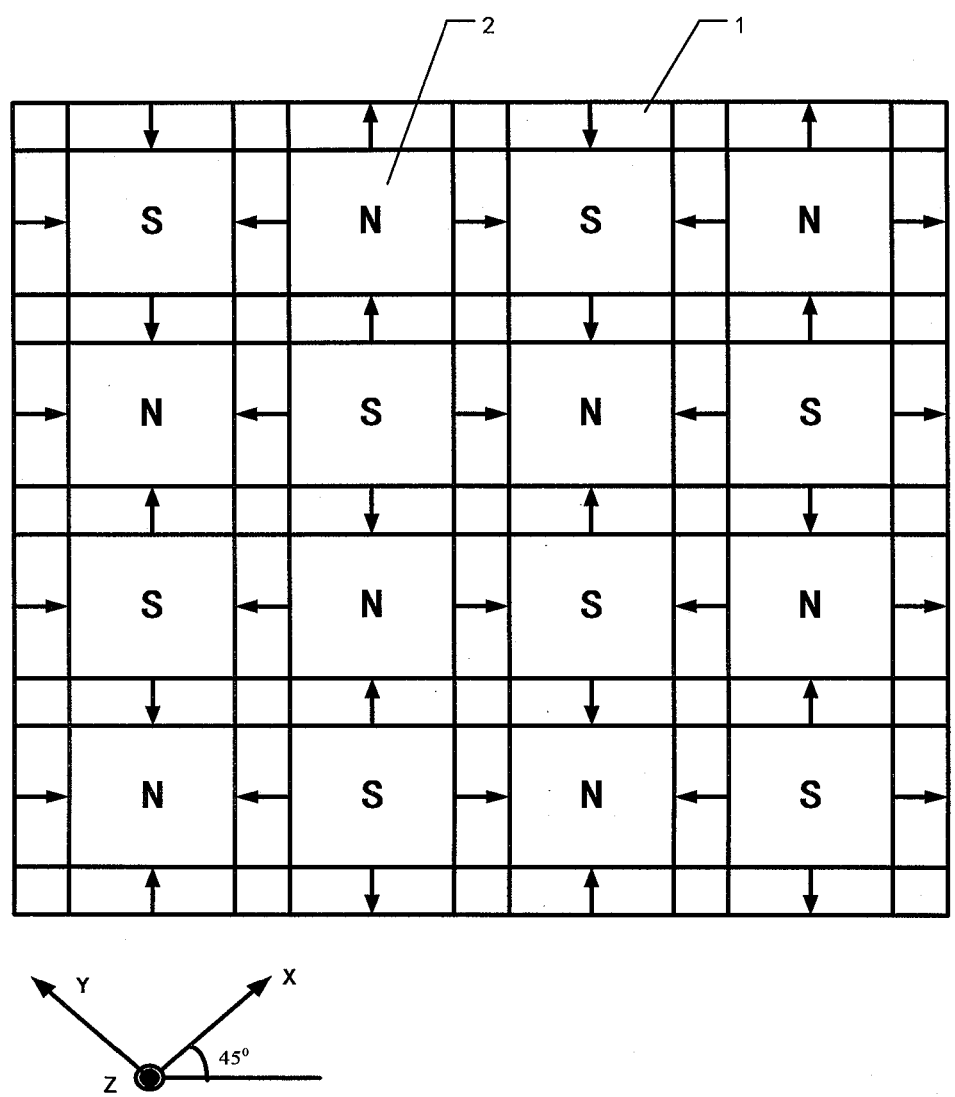
FIG. 3 is a schematic plan view of the magnetic steel array according to the present invention.
Figure 4:
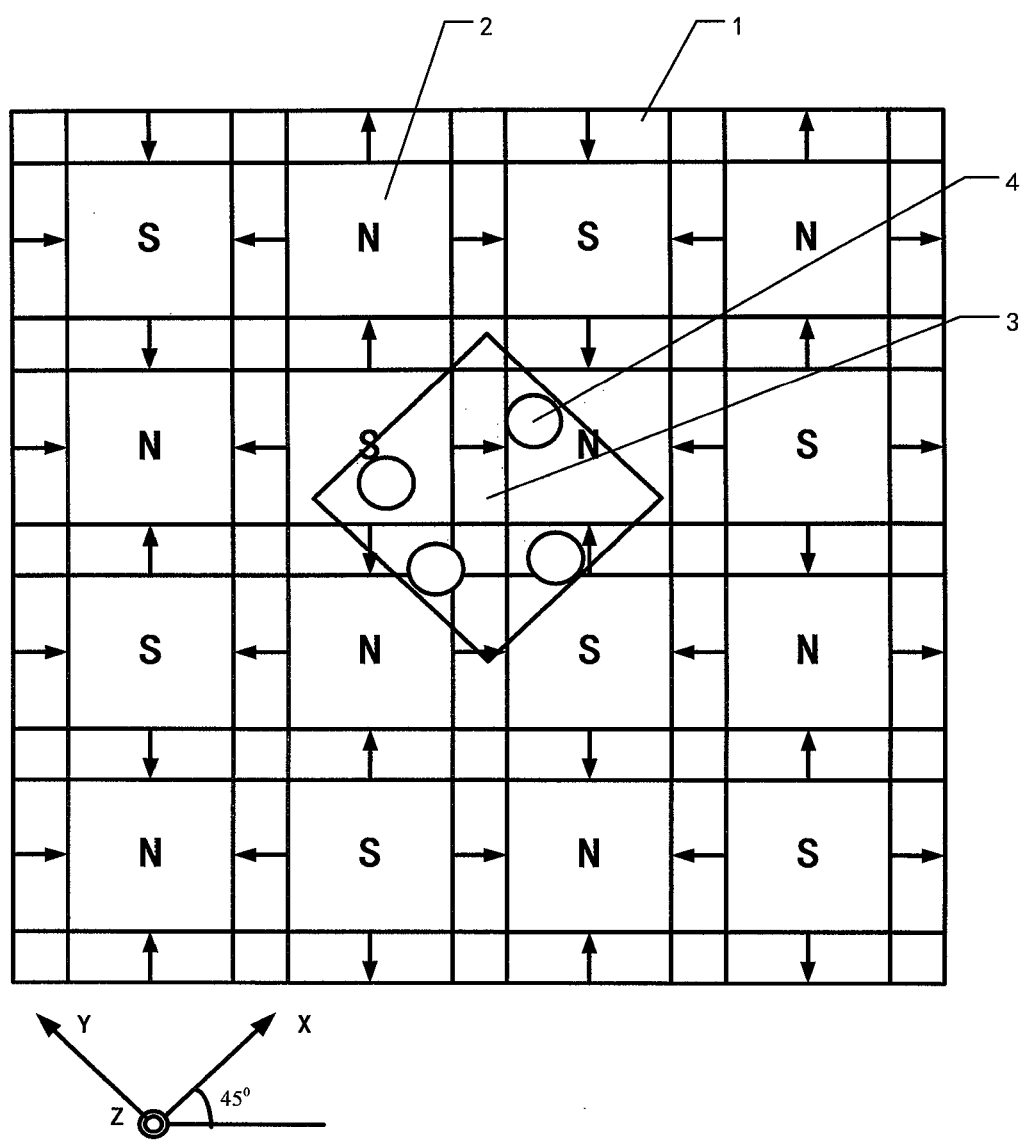
FIG. 4 is a structural representation of the research device according to the present invention, wherein, 1 represents the stationary platform, 2 the magnetic steel array, 3 the motion platform and 4 the linear Hall sensor.

FIG. 4 is a structural representation of the research device used in the present invention, which includes a stationary platform 1 and a motion platform 3 moving with respect to the stationary platform 1. The stationary platform 1 is lined with permanent magnets, i.e. the magnetic steel array 2, which are specifically arranged and designed and able to produce a magnetic flux density distribution model as shown in FIG. 2, the motion platform 3 has an area smaller than that of the stationary platform 1.

The present invention provides a two-dimensional locating method of a motion platform 3 based on a magnetic steel array 2 including the following steps:

1) selecting any n different positions within one or more polar distances of the magnetic steel array on the surface of the motion platform 3 in the motion system and placing 1 linear Hall sensor 4 at each position, wherein positions with a same phase within different polar distances are considered to be the same position and n equals to at least 4;

2) determining a formula for the magnetic flux density distribution model of the magnetic steel array 2 in the motion system:

$$B_z = A \times \sin(X+\alpha+\alpha_0) + B \times \sin(Y+\beta+\beta_0);$$

wherein, $B_z$ represents the magnetic flux density of the magnetic steel array 2, A and B represent the magnitude components of the magnetic flux density distribution model, X and Y represent the phases to be solved of the mass center of the motion platform 3 on X axis and Y axis, respectively, $\alpha$ and $\beta$ represent the phases on X and Y axis of the mounting position of the linear Hall sensor 4 with respect to the mass center of the motion platform 3, respectively, $\alpha_0$ and $\beta_0$ represent the initial phases on X and Y axis, respectively;

3) prior to the movement of the motion platform 3, measuring the mounting positions $(S_{\alpha i}, S_{\beta i})$ of the linear Hall sensors 4 mentioned in step 1), in which i=1, 2Λ, n, and converting them into the phases $(\alpha_i, \beta_i)$ with respect to the mass center of the motion platform 3, in which i=1, 2Λ, n;

4) during the operation of the motion platform 3, recording the measured values of the magnetic flux density $B_{zi}$ of all linear Hall sensors 4 mentioned in step 3), in which i=1, 2Λ, n;

5) solving the phase (X,Y) of the mass center of the motion platform 3, which is a relative phase, through a mathematical algorithm with the measured values in step 4) being served as observed quantities and the magnetic flux density distribution model of the magnetic steel array 2 in step 2) being served as a computation model;

6) according to the phase (X,Y) of the mass center of the motion platform 3 solved in step 5), further determining the position $(S_x,S_y)$ of the mass center of the motion platform 3 with respect to the initial phase, in which that the initial phase is given by a mechanical zero mounted on the motion platform 3.

The relationships between the phases $(\alpha_i, \beta_i)$ of said linear Hall sensors 4 with respect to the mass center of the motion platform 3 and the mounting positions $(S_{\alpha i}, S_{\beta i})$ thereof are as follows:

$$\alpha_i = \frac{S_{\alpha i}}{\tau} \times 2\pi, \quad \beta_i = \frac{S_{\beta i}}{\tau} \times 2\pi,$$

in which $\tau$ is the polar distance of the magnetic steel array 2 of the stationary platform 1.

The phase (X,Y) of the mass center of motion platform 3 solved in step 5) is may be subjected to the following processing:

assuming that $(X_r,Y_r)$ is the phase of the mass center of the motion platform 3 with respect to the initial phase, $N_x$ is the number of the skipped periods with respect to the initial phase in X direction, $N_y$ is the number of the skipped periods with respect to the initial phase in Y direction, then: $X_r=N_x \times 2\pi+X$, $Y_r=N_y \times 2\pi+Y$, that is, getting the phase of the mass center of the motion platform 3 with respect to the initial phase, and then getting the position of the mass center of the motion platform 3 with respect to the initial phase by $$S_x = \frac{X_r}{2\pi} \times \tau, S_y = \frac{Y_r}{2\pi} \times \tau.$$

Said mathematical algorithm in said step 5) may be implemented with a unscented Kalman filtering algorithm, and/or a nonlinear least square algorithm, and/or an extended Kalman filtering algorithm.

Said method for determining the number of the skipped periods with respect to the initial phase may be as follows:

a. assuming that $(X_n, Y_n)$ is the solved phase of the mass center of the motion platform 3 at the present moment of time, $(X_{n-1}, Y_{n-1})$ is the solved phase of the mass center of the motion platform 3 at the previous moment of time, $N_{xn}$ and $N_{yn}$ are the number of the skipped periods with respect to the initial phase at the present moment of time, $N_{x(n-1)}$ and $N_{y(n-1)}$ are the number of the skipped periods with respect to the initial phase at the previous moment of time;

b. when $(X_n - X_{n-1}) > \pi$ and it is determined that the movement velocity in X direction of the motion platform 3 is positive, $N_{xn} = N_{x(n-1)} + 1$, when $(X_n - X_{n-1}) > \pi$ and it is determined that the movement velocity in X direction of the motion platform 3 is negative, $N_{yb} = N_{y(n-1)} - 1$; when $(Y_n - Y_{n-1}) > \pi$ and it is determined that the movement velocity in Y direction of the motion platform 3 is positive, $N_{yn} = N_{y(n-1)} + 1$, when $(Y_n - Y_{n-1}) > \pi$ and it is determined that the movement velocity in Y direction of the motion platform 3 is negative, $N_{yn} = N_{y(n-1)} - 1$; when $(X_n - X_{n-1}) \leq \pi$, $N_{xn} = N_{x(n-1)}$ and when $(Y_n - Y_{n-1}) \leq \pi$, $N_{yn} = N_{y(n-1)}$.

Embodiments

Said minimum number of the linear Hall sensors 4 arranged on the motion platform 3 is determined by the number of unknown parameters contained in said magnetic flux density distribution model of the magnetic steel array 2, and on this basis, the more the sensors are arranged, the more advantageous it is in reducing uncertainty of the solved phase of the motion platform 3, therefore, n equals to at least 4.

With reference to FIG. 4, the present invention will be described by taking an example in which 4 linear Hall sensors 4 are arranged on the surface of the motion platform 3 and the unscented Kalman filtering algorithm is used, so that it will be further understood.

1) Select any 4 different positions within two polar distances of the magnetic steel array 2 on the surface of the motion platform 3 in the motion system, and place 1 linear Hall sensor 4 at each position;

2) With reference to FIG. 2, determine a formula for the magnetic flux density distribution model according to the magnetic steel array 2 in the motion system:

$$B_z = A \times \sin(X + \alpha + \alpha_0) + B \times \sin(Y + \beta + \beta_0);$$

wherein, $B_z$ represents the magnetic flux density of the magnetic steel array 2, A and B represent the magnitude components of the magnetic flux density distribution model, X and Y represent phases to be solved of the mass center of the motion platform 3 on X axis and Y axis, respectively, α and β represent the phases on X and Y axis of the mounting position of the linear Hall sensor 4 with respect to the mass center of the motion platform 3, respectively, $\alpha_0$ and $\beta_0$ represent the initial phases on X and Y axis, respectively.

3) Prior to the movement of the motion platform 3, measure the mounting positions $(S_{\alpha i}, S_{\beta i})$ of the linear Hall sensors 4 mentioned in step 1), in which i=1, 2, 3, 4, and convert them into the phases $(\alpha_i, \beta_i)$ with respect to the mass center of the motion platform 3, in which i=1, 2, 3, 4;

4) During the operation of the motion platform 3, record the measured values of the magnetic flux density $B_{zi}$ of all linear Hall sensors 4 mentioned in step 3), in which i=1, 2, 3, 4;

5) Solve the phase (X,Y) of the mass center of the motion platform 3 through a unscented Kalman filtering algorithm with the measured values in step 4) being served as observed quantities, and the magnitude components in the magnetic flux density distribution model of the magnetic steel array 2 in step 2) and the phase of the mass center of the motion platform 3 being served as a state variable x (assuming the dimension of x is L, that is, L=4), that is, x=[A B X Y] wherein x has an average value of $\bar{x}$ and a covariance matrix of $P_{xx}$, the solution procedure is as follows:

The state equation of the motion system is:

$$x_k = I_{4 \times 4} x_{k-1}$$

With the magnetic flux density distribution model in said step 2) being served as a computation model, the measurement equation for the motion system is:

$$B_{zi} = A \times \sin(X + \alpha_i + \alpha_0) + B \times \sin(Y + \beta_i + \beta_0)$$

According to the above-mentioned state equation and measurement equation, it is possible to assume a discrete equation for the motion system as follows:

$$\begin{cases} x_k = F(x_{k-1}, u_{k-1}, v_{k-1}) \\ y_k = H(x_k, n_k) \end{cases}$$

wherein $x_k$ is a unobservable state vector, $y_k$ is an observation vector, $u_k$ is an excitation input vector, $v_k$ is a system noise vector, $n_k$ is an observation noise vector. It is assumed that the above noises are all a Gaussian white noise and their covariance matrixes are Q and R, respectively.

Specific algorithm steps are as follows:

Step I: setting an initial estimate and an initial error variance for the state variable x:

$$\begin{cases} \hat{x}_0 = E[x_0] \\ P_0 = E[(x_0 - \hat{x}_0)(x_0 - \hat{x}_0)^T] \end{cases}$$

Step II: calculating the Sigma point and the corresponding weighting factor:

$$\begin{cases} x_0 = \bar{x} & i = 0 \\ x_i = \bar{x} + \left(\sqrt{(L+\lambda)P_{xx}}\right)_i & i = 1, 2, \Lambda, L \\ x_i = \bar{x} - \left(\sqrt{(L+\lambda)P_{xx}}\right)_{i-L} & i = L+1, L+2, \Lambda\Lambda, 2L \end{cases}$$

$$x^x_{i,k/(k-1)} = F(x^x_{i,k-1}, u_{k-1}, v_{k-1})$$

wherein λ is a scale factor;

Step III: predicting the average value and the covariance of the state:

$$\hat{x}_{k/(k-1)} = \sum_{i=0}^{2L} W_i^m x^x_{i,k/(k-1)}$$

-continued $$P_{k/(k-1)} = \sum_{i=0}^{2L} W_i^c (x_{i,k/(k-1)}^x - \hat{x}_{k/(k-1)})(x_{i,k/(k-1)}^x - \hat{x}_{k/(k-1)})^T + Q$$

wherein $W_i^m$ and $W_i^c$ are two sets of weighting coefficients, the expressions of which are as follows:

$$W_0^m = \frac{\lambda}{L+\lambda}$$

$$W_0^c = \frac{\lambda}{L+\lambda}$$

$$W_i^m = W_i^c = \frac{\lambda}{2(L+\lambda)}$$

$$i = 1, 2, \wedge\wedge 2L$$

Step IV: updating with the observed quantities:

$$Y_{i,k/(k-1)} = H(x_{i,k/(k-1)}^x)$$

$$\hat{y}_k = \sum_{i=0}^{2L} W_i^m Y_{i,k/(k-1)}$$

$$P_{\hat{y}_k} = \sum_{i=0}^{2L} W_i^c (Y_{i,k/(k-1)} - \hat{y}_k)(Y_{i,k/(k-1)} - \hat{y}_k)^T + R$$

$$P_{x_k,y_k} = \sum_{i=0}^{2L} W_i^c (x_{i,k/(k-1)}^x - \hat{x}_{k/(k-1)})(Y_{i,k/(k-1)} - \hat{y}_k)^T$$

$$K_k = P_{x_k,y_k} P_{\hat{y}_k}^{-1}$$

$$\hat{x}_k = \hat{x}_{k/(k-1)} + K_k(y_k - \hat{y}_k)$$

$$P_k = P_{k/(k-1)} - K_k P_{\hat{y}_k} K_k^T$$

Step V: proceeding to step 2 if any measured values of the linear Hall sensors 4 are not used yet, otherwise, outputting the phase of the mass center of the motion platform 3

$$\begin{cases} X = \hat{x}_k(3) \\ Y = \hat{x}_k(4) \end{cases};$$

6) Further determining the position $(S_x, S_y)$ of the mass center of the motion platform 3 with respect to the initial phase according to the phase (X,Y) of the mass center of the motion platform solved in step 5) and the following conversion formulae:

$$X_r = N_x \times 2\pi + X, \ Y_r = N_y \times 2\pi + Y \text{ and}$$

$$S_x = \frac{X_r}{2\pi} \times \tau, \ S_y = \frac{Y_r}{2\pi} \times \tau.$$

With the above-explained two-dimensional locating method for a motion platform 3 based on a magnetic steel arrays 2 according to the present invention, it is possible to solve the phase of the mass center of the motion platform 3 for a motion system containing the magnetic steel arrays 2 by combining the data of multiple sensors, thus provide a simple, convenient and robust method of calculating positions of the mass center of a platform for this type of motion system such as a magnetic levitation or an air levitation planar motor. The idea and effects of the present invention have practical significance for the research and development in the location of the motion platform 3 of the motion system containing the magnetic steel arrays 2.

The invention claimed is:

1. A method for measuring position of a motion platform based on a magnetic steel array, said magnetic steel array being arranged on the upper surface of a stationary platform, said motion platform moving in a straight line with respect to the stationary platform, characterized in that said method comprises:
   1) placing one linear Hall sensor at each of n positions on the surface of the motion platform, wherein the n positions are selected within one or more polar distances of the magnetic steel array on the surface of the motion platform in the motion system, and wherein positions with a same phase within different polar distances are considered to be the same position and n equals to at least 4;
   2) determining a formula for the magnetic flux density distribution model according to the magnetic steel array in the motion system:

$$B_z = A \times \sin(X + \alpha + \alpha_0) + B \times \sin(Y + \beta + \beta_0);$$

in which $B_z$ represents the magnetic flux density of the magnetic steel array, A and B represent the magnitude components of the magnetic flux density distribution model, X and Y represent the phases to be solved of the mass center of the motion platform on X axis and Y axis, respectively, $\alpha$ and $\beta$ represent the phases on X and Y axis of the mounting position of the linear Hall sensor with respect to the mass center of the motion platform, respectively, $\alpha_0$ and $\beta_0$ represent the initial phases on X and Y axis, respectively;
   3) prior to the movement of the motion platform, measuring the mounting positions $(S_{\alpha i}, S_{\beta i})$ of the linear Hall sensors mentioned in step 1), in which i=1, 2, ..., n, and converting them into the phases $(\alpha_i, \beta_i)$ with respect to the mass center of the motion platform, In which i=1, 2, ..., n;
   4) during the operation of the motion platform, measuring magnetic flux density using each of the linear Hall sensors mentioned in step 3), and recording the measured values of the magnetic flux density $B_{zi}$ of all linear Hall sensors, in which i=1, 2, ..., n;
   5) obtaining the phase (X,Y) of the mass center of the motion platform, which is a relative phase, through a mathematical algorithm with the measured values in step 4) being served as observed quantities and the magnetic flux density distribution model of the magnetic steel array in step 2) being served as a computation model;
   6) according to the phase (X,Y) of the mass center of the motion platform solved in step 5), further determining the position $(S_x, S_y)$ of the mass center of the motion platform with respect to the initial phase, in which the initial phase is given by a mechanical zero mounted on the motion platform.

2. The method for measuring position of a motion platform based on a magnetic steel array of claim 1, characterized in that the relationships between the phases $(\alpha_i, \beta_i)$ of said linear Hall sensors with respect to the mass center of the motion platform and the mounting positions $(S_{\alpha i}, S_{\beta i})$ thereof are as follows:

$$\alpha_i = \frac{S_{\alpha i}}{\tau} \times 2\pi, \beta_i = \frac{S_{\beta i}}{\tau} \times 2\pi,$$

in which τ is the polar distance of the magnetic steel array of the stationary platform.

3. The method for measuring position of a motion platform based on a magnetic steel array of claim 2, characterized in that the phase (X,Y) of the mass center of the motion platform solved in step 5) is subjected to the following processing:

assuming $(X_r, Y_r)$ is the phase of the mass center of the motion platform with respect to the initial phase, $N_x$ is the number of the skipped periods with respect to the initial phase in X direction, $N_y$ is the number of the skipped periods with respect to the initial phase in Y direction, then: $X_r = N_x \times 2\pi + X$, $Y_r = N_y \times 2\pi + Y$, that is, getting the phase of the mass center of the motion platform with respect to the initial phase, and then getting the position of the mass center of the motion platform with respect to the initial phase by $$S_x = \frac{X_r}{2\pi} \times \tau, S_y = \frac{Y_r}{2\pi} \times \tau.$$

4. The method for measuring position of a motion platform based on a magnetic steel array of claim 1, characterized in that said mathematical algorithm in the step 5) is implemented with a unscented Kalman filtering algorithm, and/or a nonlinear least square algorithm, and/or an extended Kalman filtering algorithm.

5. The method for measuring position of a motion platform based on a magnetic steel array of claim 3, characterized in that said method for determining the number of the skipped periods with respect to the initial phase is as follows:

a. assuming $(X_n, Y_n)$ is the solved phase of the mass center of the motion platform at the present moment of time, $(X_{n-1}, Y_{n-1})$ is the solved phase of the mass center of the motion platform at the previous moment of time, $N_{xn}$ and $N_{yn}$ are the number of the skipped periods with respect to the initial phase at the present moment of time, $N_{x(n-1)}$ and $N_{y(n-1)}$ are the number of the skipped periods with respect to the initial phase at the previous moment of time;

b. when $(X_n - X_{n-1}) > \pi$ and it is determined that the movement velocity in X direction of the motion platform is positive, $N_{xn} = N_{x(n-1)} + 1$, when $(X_n - X_{n-1}) > \pi$ and it is determined that the movement velocity in X direction of the motion platform is negative, $N_{yn} = N_{y(n-1)} - 1$; when $(Y_n - Y_{n-1}) > \pi$ and it is determined that the movement velocity in Y direction of the motion platform is positive, $N_{yn} = N_{y(n-1)} + 1$, when $(Y_n - Y_{n-1}) > \pi$ and it is determined that the movement velocity in Y direction of the motion platform is negative, $N_{yn} = N_{y(n-1)} - 1$; when $(X_n - X_{n-1}) \leq \pi$, $N_{xn} = N_{x(n-1)}$ and when $(Y_n - Y_{n-1}) \leq \pi$, $N_{yn} = N_{y(n-1)}$.

* * * * *